T. C. JOHNSON & F. F. BURTON.
PORTABLE DEVICE FOR LOADING BOX MAGAZINES FROM CARTONS.
APPLICATION FILED JAN. 4, 1918.
1,295,039.
Patented Feb. 18, 1919.
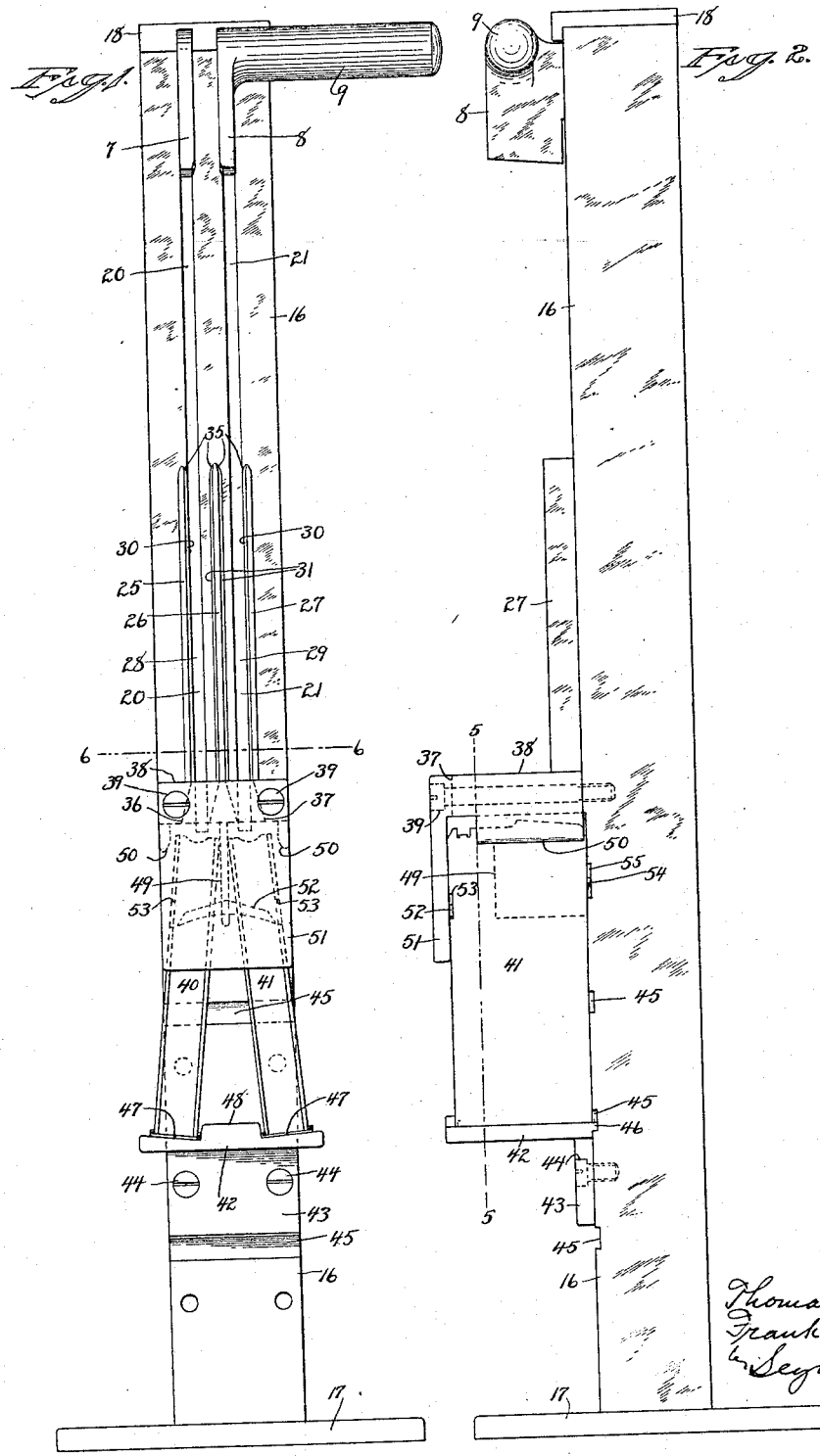

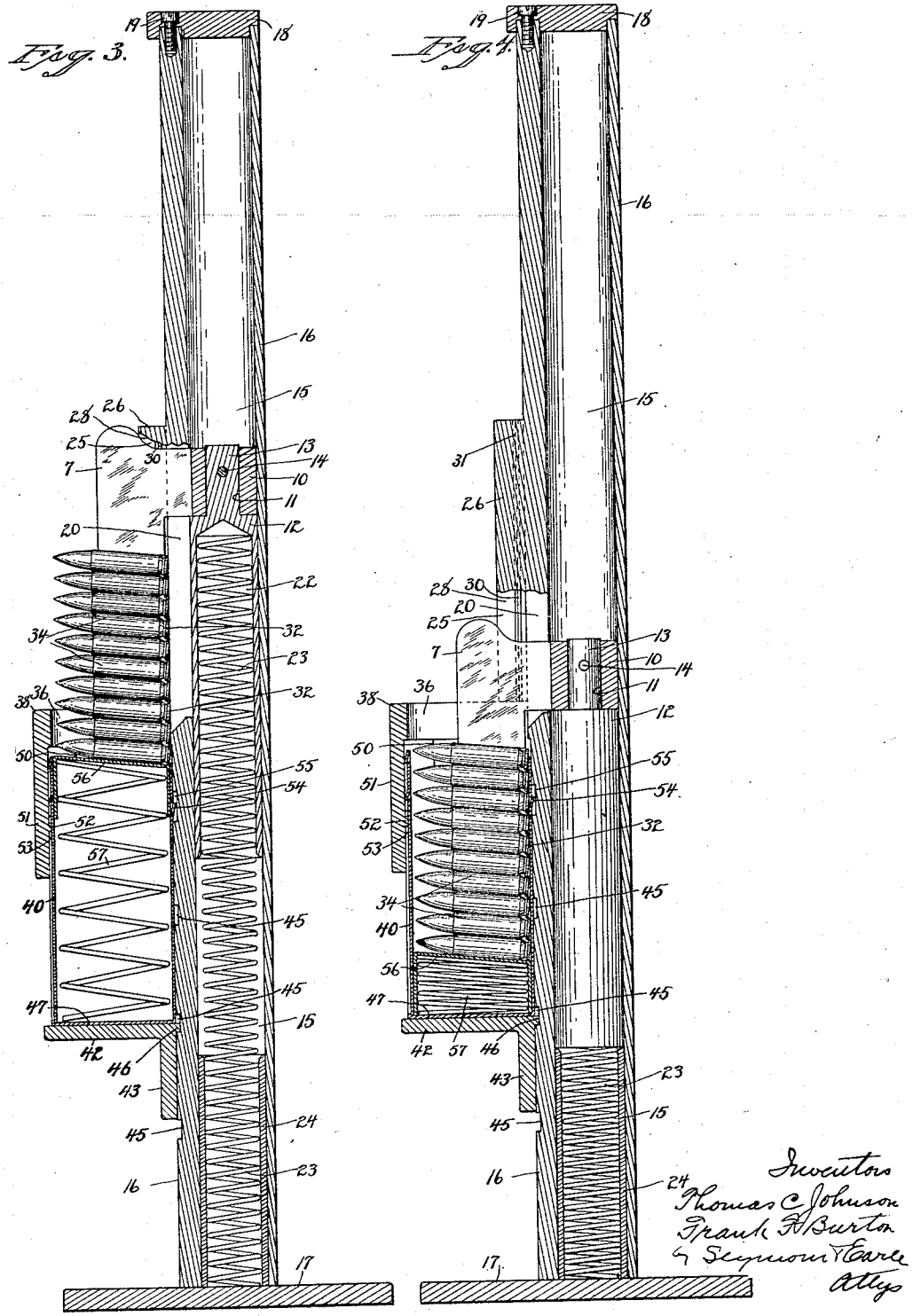

T. C. JOHNSON & F. F. BURTON.
PORTABLE DEVICE FOR LOADING BOX MAGAZINES FROM CARTONS.
APPLICATION FILED JAN. 4, 1918.
1,295,039.
Patented Feb. 18, 1919.
3 SHEETS—SHEET 3.
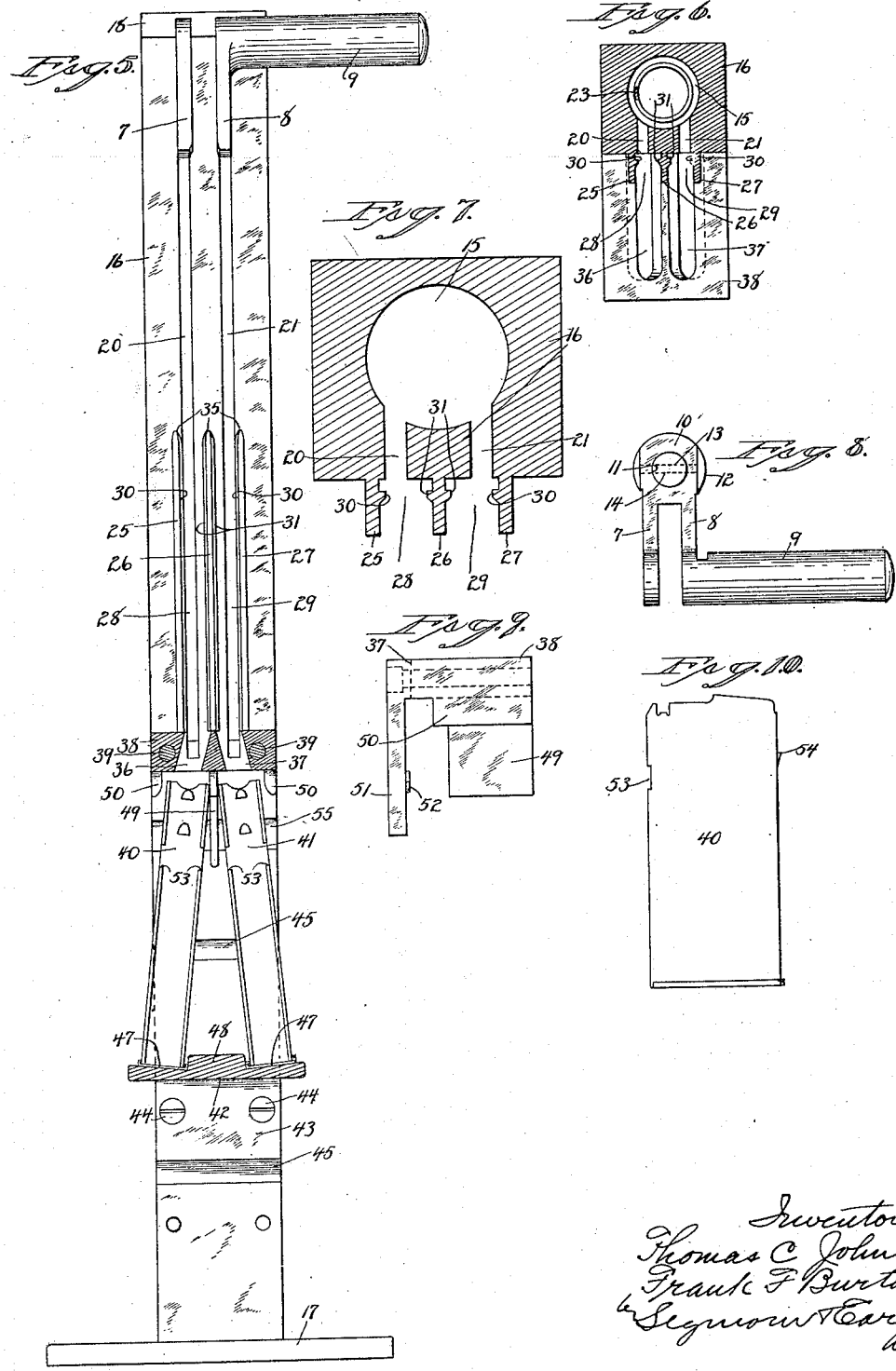

UNITED STATES PATENT OFFICE.

THOMAS C. JOHNSON, OF NEW HAVEN, AND FRANK F. BURTON, OF EAST HAVEN, CONNECTICUT, ASSIGNORS TO WINCHESTER REPEATING ARMS CO., OF NEW HAVEN, CONNECTICUT, A CORPORATION.

PORTABLE DEVICE FOR LOADING BOX-MAGAZINES FROM CARTONS.

1,295,039.  Specification of Letters Patent.  Patented Feb. 18, 1919.

Application filed January 4, 1918. Serial No. 210,328.

*To all whom it may concern:*

Be it known that we, THOMAS C. JOHNSON and FRANK F. BURTON, citizens of the United States, residing, respectively, at New Haven and East Haven, in the county of New Haven and State of Conecticut, have invented a new and useful Improvement in Portable Devices for Loading Box-Magazines from Cartons; and we do hereby declare the following, when taken in connection with the accompanying drawings and the characters of reference marked thereon, to be a full, clear, and exact description of the same, and which said drawings constitute part of this application, and represent, in—

Figure 1 a view in front elevation of our improved portable device for loading box-magazines from paper cartons preparatory to their introduction into machine guns or shoulder arms.

Fig. 2 a view thereof in side elevation.

Fig. 3 a view of the device in vertical central section with the central cartridge-guide-way flange and the inner wall of the left hand box-magazine broken away, and with a column of cartridges shown just prior to its introduction into such magazine.

Fig. 4 a corresponding view with the column of cartridges shown as charged into the magazine.

Fig. 5 a view in front elevation with the upper and lower magazine-supports shown in vertical section on the line 5—5 of Fig. 2.

Fig. 6 a view of the device in transverse section on the line 6—6 of Fig. 1.

Fig. 7 a detached horizontal sectional view of the frame showing the two cartridge-guideways formed by the three cartridge-guideway flanges.

Fig. 8 a detached plan view of the plural loading-member and plunger.

Fig. 9 a detached view in side elevation of the upper magazine-support.

Fig. 10 a detached view in side elevation of a typical box-magazine.

Our invention relates to a portable device for loading box-magazines directly from cartons preparatory to their introduction into machine guns or shoulder arms, as the case may be, the object being to produce a simple, convenient, rapidly operable device of the character described, adapted to be used for simultaneously loading a plurality of magazines.

In carrying out our invention, as herein shown, we employ a plural loading-member having two parallel loading-leaves 7 and 8, a handle 9 extending laterally outward from the upper portion of the right hand leaf 8, and a substantially circular head 10 formed with a central bore 11. By preference, the several parts of the said loading-member will be made integral, though this is not necessary. The said member is mounted through the bore 11 in its head 10, upon the shouldered upper end of a plunger 12 having a stud 13 to which the said head is fastened by a pin 14. This part we have elected to call a plural loading-member on account of its adaptation to load more than one box-magazine at a time. The said plunger is located in the chamber 15 of an upright frame 16 attached at its lower end to a base 17, and closed at its upper end by a cap 18 secured in place by screws 19, only one of which is shown. The said head 10 is located entirely within the chamber 15 from which the leaves 7 and 8 laterally project through vertical slots 20 and 21 formed in the front of the frame, as clearly shown in Fig. 5. The plunger is chambered as at 22 for the reception of the upper end of a helical plunger-spring 23 the lower end of which enters a stop-sleeve 24 located in the lower end of the chamber 15 of the frame. Under this construction, the leaves 7 and 8 of the plural loading-member travel up and down in the slots 20 and 21 in the frame, the front face of which is formed, as shown, with three integral parallel, vertically arranged cartridge-guideway flanges 25, 26 and 27, of which the flanges 25 and 27 are located outside of the outer walls of the slots 20 and 21, while the flange 26 is located between the said slots, whereby two cartridge-guideways 28 and 29, arranged side by side, and separated only by the intermediate flange 26, are produced. The inner faces of the right and left outer flanges 25 and 27 are formed with inwardly projecting retaining-ribs 30, while the opposite faces of the intermediate flange 26 are formed with complementary retaining-ribs 31, as clearly shown in Fig. 6. These ribs enter the cannelures 32 in the head ends of the body-portions of the cartridges 34 which are of the type commonly known as rimless or headless. In loading rim-cartridges, so called, the retaining-ribs aforesaid will engage with the inner or under faces of their offsetting rims. The upper ends of the flanges 25, 26 and 27 are slightly pointed as at 35 to form, as it were, flaring mouths for the upper ends of the cartridge-guideways 28 and 29.

The lower ends of the said guideways 28 and 29 respectively intersect the inner ends of two horizontal cartridge-receiving slots 36 and 37 arranged side by side and formed in a horizontally arranged upper magazine-support 38 attached by screws 39 to the frame 16 below the center thereof, the said slots being divergent with respect to each other, as shown in Fig. 5, for directing the cartridges from the lower ends of the respective guideways into the registered open upper ends of two box-magazines 40 and 41, which may be of any approved construction, and which rest, while being loaded, upon a table-like lower magazine-support 42 having a depending flange 43 by means of which it is fastened by screws 44 to the upright frame 16 which is formed in its front face with a vertical series of transverse grooves 45 to enable the said lower magazine-support to be shifted in vertical position as required for adapting the device to loading magazines varying in length from the shortest to the longest in use, the said grooves 45 receiving a supporting-rib 46 formed upon the rear upper corner of the support 42 which is also formed with two inwardly inclined magazine-seats 47 separated by an abutment rib 48 rising between them, and extending from front to rear.

The upper magazine-support 38 is formed with a positioning-flange or web 49 depending from it between the slots 36 and 37 and provided to arrest and position as to inward movement, the upper ends of the inwardly tilted box-magazines 40 and 41, as shown in Fig. 5. The said support is also formed with two depending, beveled stop-flanges 50 extending along its side edges from front to rear, and providing for preventing the outward displacement of the upper ends of the box-magazines which are in effect "hooked" under them. The said support is provided, at its forward end, with a depending apron 51 having upon its inner face (Fig. 1) a double-ended ward-like rib 52 having beveled ends and designed to prevent the improper insertion of the box-magazines which are formed in their forward edges with special clearance-notches 53 which receive the ends of the said rib when the magazines are presented for insertion with their forward edges outermost. If, on the other hand, the magazines are reversed edge for edge at the time of presentation for insertion, the said rib will block the way.

For the clearance of the regulation stop-lugs 54 upon the rear edges of the magazines, the frame is formed with a transverse recess 55 as shown in Figs. 4 and 5. Box-magazines, however they may vary in details of construction, are furnished with a follower 56 and a follower-spring 57.

In the use of our improved device, a paper carton carrying, as usual, two parallel columns of cartridges, is applied by the user, who holds it in one hand, to the device, so that the heads of the cartridges abut squarely against the front face of the frame, the lowermost cartridges of the respective columns of cartridges being registered with the flaring mouths of the two cartridge-guideways 28 and 29. By a sweeping downward movement of the hand, the respective columns of cartridges are entered into the said guideways in which they are caught and retained by the ribs 30 and 31, after which the carton is stripped away from them, and discarded, leaving the two columns of cartridges resting respectively, upon the followers of two magazines previously positioned between the upper and lower magazine-supports. The loading-member is now grasped by its handle 9 and forced downward against the tension of the plunger-spring 23, causing its respective loading-leaves to enter the upper ends of the respective guideways and engage with the uppermost cartridges of the respective columns. Continued downward pressure upon the handle 9 forces the respective columns of cartridges downward through the diverging cartridge-receiving slots 36 and 37 in the upper magazine-support, and into the respective magazines which are thus simultaneously loaded. The handle 9 being released, the loading-head is at once restored to its normal, elevated position by the plunger-spring 23. The loaded box-magazines are now manually removed from the device, and the operation above rehearsed, is repeated.

In the introduction of the magazines, they are tilted inwardly until their upper ends engage with the positioning web 49 which limits their inward movement and registers their open upper ends with the cartridge-receiving slots in the upper magazine-support. They are then lifted upward, whereby they are hooked, so to speak, under the stop-flanges 50, after which their lower ends are swung inward so as to rest upon the inwardly inclined magazine-seats 47 of the lower magazine-support. While we have shown the device as adapted for simultaneously loading two box-magazines, we would have it understood that our invention might be embodied in a machine for simultaneously loading more than two magazines. Also, the construction described in nowise prevents the use of the device for loading a single magazine when required. In such case, after the magazine has been positioned on the magazine supports, one of the two columns of cartridges in a carton is introduced into the guideway above the magazine; the other column of cartridges in the carton passing downward, outside the guideway, remains in place in the carton when the latter is withdrawn. After the column of cartridges in the guideway has been forced into the magazine by the loading member, the remaining column of cartridges in the carton is introduced into the same guideway and the loading movement is repeated.

We claim:

1. In a device for loading box-magazines for firearms, the combination with a frame having a plurality of cartridge-guideways, of means for supporting and positioning a plurality of magazines in position to receive cartridges from the said guideways.

2. In a device for loading box-magazines for firearms, the combination with a frame having a plurality of cartridge-guideways, of a magazine-support having a plurality of cartridge-receiving openings adapted and postioned to receive and direct the cartridges which are forced through the said cartridge-guideways into the magazines.

3. In a device for loading box-magazines for firearms, the combination with a frame having a plurality of cartridge-guideways, of a manually operable loading-member adapted to force the cartridges through the said guideways, and means for supporting and positioning a plurality of box-magazines in position to receive cartridges from the said guideways.

4. In a device for loading box-magazines for firearms, the combination with a frame having cartridge-guideways, of a plural loading-member, and a magazine-support having cartridge-receiving openings and adapted to support and position two box-magazines simultaneously in position to receive columns of cartridges from the respective openings.

5. In a device for loading box-magazines for firearms, the combination with a frame having cartridge-guideways, of adjustable means for supporting box-magazines in position to receive cartridges from the said guideways.

6. In a device for loading box-magazines for firearms, the combination with a frame having cartridge-guideways, of a plural loading-member, and means for supporting two box-magazines in position to receive cartridges from the said guideways, including a longitudinally adjustable magazine-support.

7. In a device for loading box-magazines for firearms, the combination with a frame having cartridge-guideways, of a plural loading-member, and means for supporting two box-magazines in position to receive cartridges from the said guideways, including a magazine-support having two inwardly inclined magazine seats.

8. In a device for loading box-magazines for firearms, the combination with a frame having cartridge-guideways, of a manually operable loading-member, and means for supporting two box-magazines in position to receive cartridges from the said guideways, including a magazine-support having two magazine-seats and an upstanding abutment separating the same.

9. In a device for loading box-magazines for firearms, the combination with a frame having two cartridge-guideways, of a plural loading-member, a box-magazine support formed with two cartridge-receiving openings respectively intersected by the discharging ends of the said guideways, and a positioning-flange or web for positioning the receiving ends of two box-magazines relative to the respective cartridge-receiving openings.

10. In a device for loading box-magazines for firearms, the combination with a frame having cartridge-guideways, of a longitudinally movable, non-pivotal, loading-member, and a box-magazine support having stop flanges for limiting the outward movement of the receiving ends of the magazines.

11. In a device for loading box-magazines for firearms, the combination with a frame having cartridge-guideways, of a loading-member for co-action with the said guideways, and box-magazine supporting means, including a depending apron provided with a projection adapted to co-act with corresponding notches in the magazines.

12. In a device for loading box-magazines for firearms, the combination with a frame having cartridge-guideways, of a plural loading-member, and means for supporting two box-magazines in inclined positions with respect to each other, whereby they may be readily grasped for removal by the insertion of the fingers between them.

13. In a device for loading box-magazines for firearms, the combination with a frame having two longitudinal cartridge-guideways located side by side, of a longitudinally movable loading-member adapted to enter the respective guideways, and means for supporting two box-magazines while the same are being charged with cartridges forced through the said guideways and into the said magazines by the said loading-member.

14. In a device for loading box-magazines for firearms, the combination with a frame having a plurality of cartridge-guideways arranged side by side, of a movable loading-member having leaves adapted to enter the respective guideways, a primary box-magazine support offsetting from the said frame and having cartridge-receiving openings intersected by the discharging ends of the said guideways; and a secondary magazine-support upon which the magazines are supported with their mouths registering with the said openings.

15. In a device for loading box-magazines for firearms, the combination with a frame having two cartridge-guideways arranged side by side, of a loading-member having two leaves respectively entering the said guideways, an upper magazine-support having two cartridge-receiving openings respectively intersected by the lower ends of the said guideways, the said openings being arranged divergently with respect to each other, and a lower magazine-support adapted to support two magazines while their upper ends are positioned by the said upper magazine support so that their mouths register with the said cartridge-receiving openings therein.

16. In a device for loading box-magazines for firearms, the combination with an upright frame having three projecting parallel flanges forming two cartridge-guideways, of a movable loading-member adapted to simultaneously enter the said guideways and rigidly connected with a plunger located and sliding within the said frame, and magazine-supporting means located below the said guideways and adapted to support two magazines with the mouths thereof substantially registered with the lower ends of the said guideways for the reception of cartridges forced through the same and into the said magazines by the said loading-member.

In testimony whereof, we have signed this specification in the presence of two subscribing witnesses.

THOMAS C. JOHNSON.
FRANK F. BURTON.

Witnesses:
MALCOLM P. NICHOLS,
FREDERIC C. EARLE.

Copies of this patent may be obtained for five cents each, by addressing the "Commissioner of Patents, Washington, D. C."